United States Patent
De Guglielmo et al.

(10) Patent No.: US 6,662,933 B2
(45) Date of Patent: Dec. 16, 2003

(54) SYSTEM FOR CONVEYING OBJECTS

(75) Inventors: Pascal De Guglielmo, Montgueux (FR); Alain Cartier, Fontvannes (FR); Didier Clerget, Troyes (FR)

(73) Assignee: Aries Packaging, Rosieres Pers Troyes (FR)

(*) Notice: Subject to any disclaimer, the term of this patent is extended or adjusted under 35 U.S.C. 154(b) by 137 days.

(21) Appl. No.: 09/751,360

(22) Filed: Dec. 28, 2000

(65) Prior Publication Data

US 2001/0032775 A1 Oct. 25, 2001

(51) Int. Cl.$^7$ .............................................. B65G 19/26
(52) U.S. Cl. .................... 198/732; 198/473.1; 198/718; 198/728; 198/746; 198/717
(58) Field of Search .......................... 198/469.1, 473.1, 198/474.1, 476.1, 717, 718, 722, 725, 728, 731, 732, 746

(56) References Cited

U.S. PATENT DOCUMENTS

| | | | | |
|---|---|---|---|---|
| 3,232,414 A | * | 2/1966 | Brigham et al. | 74/141 |
| 3,589,497 A | * | 6/1971 | Leach | 198/459.8 |
| 3,845,852 A | | 11/1974 | Langen et al. | 198/34 R |
| 3,993,188 A | * | 11/1976 | Muller | 198/461.3 |
| 4,417,653 A | * | 11/1983 | Zwezerynen | 198/718 |
| 4,552,261 A | | 11/1985 | Raudat et al. | 198/425 |
| 5,042,636 A | * | 8/1991 | Underwood | 198/890 |
| 5,501,318 A | * | 3/1996 | Disrud | 198/732 |
| 5,724,785 A | * | 3/1998 | Malanowski | 531/48.1 |
| 5,937,999 A | * | 8/1999 | Spatafora | 198/728 |
| 6,024,207 A | * | 2/2000 | Looser et al. | 198/473.1 |
| 6,260,690 B1 | * | 7/2001 | Batzer | 198/626.5 |
| 6,378,693 B1 | * | 4/2002 | Ballestrazzi et al. | 198/732 |
| 6,427,825 B1 | * | 8/2002 | Biagiotti | 198/461.2 |

FOREIGN PATENT DOCUMENTS

| | | | | |
|---|---|---|---|---|
| DE | 31 29 723 A1 | 7/1981 | | B65G/47/29 |
| DE | 31 51 997 A1 | 12/1981 | | B65B/35/44 |
| EP | 0 526 184 A1 | 2/1993 | | B65B/21/06 |
| GB | 974995 | 11/1964 | | |

* cited by examiner

*Primary Examiner*—Khoi H. Tran
(74) *Attorney, Agent, or Firm*—Nawrocki, Rooney & Sivertson, P.A.

(57) ABSTRACT

A system for conveying objects (1), which comprises at least one endless transporter (2) able to route the objects (3) along a so-called transportation surface (S), the transporter (2) comprising a plurality of pushers (6) regularly spaced apart, fixed to a movable support (7) for the pushers (6), continuously travelling, in a single direction and periodically along a closed-loop path which extends substantially in a so-called conveying plane (P), perpendicular to the said transportation surface (S) the path being locally contiguous with the transportation surface (S), characterized in that each pusher (6) is mounted so as to be able to move between a so-called inactive position in which the pusher (6) is located at a distance from the transportation surface (S) and does not project therefrom, and a so-called active position in which it projects at least partially from the transportation surface (S) in order to come into engagement with an object (3) and push it along the said surface (S), so that it is possible to vary the number of pushers (6) simultaneously in the active position.

23 Claims, 6 Drawing Sheets

SYSTEM FOR CONVEYING OBJECTS

BACKGROUND OF INVENTION

The invention relates to a system for conveying objects.

The invention applies notably to the packaging of articles such as bottles or cans, generally cylindrical in shape.

It is known that the articles are first of all routed individually on a supply track up to a grouping station where the batches of articles are formed and then spaced apart in order to be transferred to a discharge track, along which they are wrapped or packed.

In order to form a space between two successive batches of articles, it is known that the batches of articles can be accelerated between the supply track and the discharge track.

In this regard, it is possible to cite notably the document GB-974 995.

The space then formed between the same faces of two consecutive batches is referred as the "pitch" or the "machine pitch".

Distributors are at the present time seeking to reduce their stocks whilst offering ever more diversified ranges of packaged products.

In addition, distributors require to be able to vary their offer within the same product range, by offering to consumers, for the same article, such as a bottle or a can filled with a beverage, varied packagings such as packs of two, three, four, six or eight articles or more.

In order to meet these requirements, manufacturers must be in a position to continually renew their machine ranges, so as to adapt them not only to the shapes of new products, and to their sizes and weights, but also to the size and shape of their packaging, usually cardboard blanks or equivalent.

At the present time manufacturers are offering distributors packaging solutions or machines which have many drawbacks.

Certain manufacturers are offering distributors one machine for each type of finished product, which is cumbersome and expensive.

Other manufacturers, for their part, are offering a machine for each range of products, which requires setting the machine according to the type of packaging required: batches of two, four, six, eight or more.

This is because, for a constant machine throughput (and therefore a constant input speed), it is necessary to adapt the output speed and/or the machine pitch.

The majority of machines do not have a pitch adjusting system. It is therefore necessary to increase the output speed, the pitch being fixed whatever the number of articles per batch, such as for example in the document DE 31 29 723.

Thus changing for example from a grouping by batches of twelve articles to a grouping by batches of four makes it necessary to triple the output speed of the machine, which is incompatible with the physical limits of the installations, and in particular the packaging devices.

Some machines have manual pitch adjusting systems, which requires as many manual actions as there are changes of product within the same range.

At the present time, the frequencies of these changes may attain two to three per day, a frequency which is difficult to attain by means of manual adjustments.

SUMMARY OF THE INVENTION

The invention aims at resolving notably the aforementioned drawbacks of the prior art, by proposing a conveying system which allows the automatic adjustment both of the machine pitch and of the production rate.

To this end, the object of the invention is a system for conveying objects, which comprises at least one endless transporter able to route the objects along a so-called transportation surface, the transporter comprising a plurality of pushers regularly spaced apart, fixed to a movable support for the pushers, continuously travelling, in a single direction and periodically along a closed-loop path which extends substantially in a so-called conveying plane, perpendicular to the said transportation surface, the path being locally contiguous with the transportation surface, each pusher being mounted so as to be able to move between a so-called inactive position in which the pusher is located at a distance from the transportation surface and does not project therefrom, and a so-called active position in which it projects at least partially from the transportation surface in order to come into engagement with an object and push this object along the said surface, so that it is possible to vary the number of pushers simultaneously in the active position.

According to one embodiment, the said conveying system comprises:

a means of driving the support means;

a movable member for actuating the pushers in order to cause them to pass from their inactive position to their active position at the transportation surface;

a means of driving the said actuating member;

a device for controlling the drive means.

The control device is arranged to apply notably to the means of driving the support means and/or to the means of driving the actuating member, a speed profile chosen from amongst a preprogrammed set of speed profiles.

For example, the control device is arranged to apply to the means of driving the actuating member a speed profile such that the operation of the actuating member is periodic, the period of the actuating member being defined as the interval of time separating two successive passages of the actuating member through the same position.

The period of the transporter being defined as the interval of time separating the passage of two pushers through the same point on the path, the control device is for example arranged so that the period of the actuating member is a multiple of the period of the transporter.

According to one embodiment, the said movable support is an endless chain meshing with two pinions, at least one of which is slaved to the control device.

Whilst each pusher is, for example, in the form of a rigid piece which comprises a first branch able to come into engagement with the drive member, and a second branch substantially perpendicular to the first, able to project at least partly from the transportation surface in order to be able to come into engagement with an object.

According to one embodiment, the second branch has a surface substantially perpendicular to the said conveying plane and which, when the pusher is in its active position, extends substantially perpendicularly to the transportation surface in order to come into contact with the object.

In addition, each pusher comprises for example a shaft substantially perpendicular to the conveying plane, forming a means of fixing the pusher to the support means, and about which the pusher is able to pivot, in order to pass from its inactive position to its active position, or vice-versa.

According to one embodiment, the transporter comprises a guide rail which extends substantially in the conveying plane, substantially along the path defined by the support.

The guide rail can comprise, substantially along the transportation surface, a first so-called top track for guiding the pushers, contiguous with the transportation surface, and a second so-called bottom track for guiding the pushers, parallel to the first.

Each pusher for its part can comprise, alone or in combination:

- at least one first toe, projecting from the first branch substantially perpendicularly to the conveying plane, able to cooperate with the bottom track when the pusher is in the inactive position, and with the top track when the pusher is in the active position;
- at least one second toe, projecting from the first branch perpendicularly to the conveying plane, able to cooperate with the top track when the pusher is in the inactive position.

According to one embodiment, the transporter has a so-called switching zone where the guide rail is interrupted, and in which the pushers are able to pivot about their shaft in order to pass from their inactive position to their active position.

The actuating member, for its part, can comprise a cam extending substantially in the conveying plane close to the said switching zone, and driven in rotation in this plane about a shaft substantially perpendicular to this by the said drive means, passing through a first angular position in which the said cam engages at least one of the pushers in order to cause it to pivot about its shaft from its inactive position to its active position when passing through the switching zone, and a second angular position in which the said cam releases the pusher.

For example, the cam is arranged to come momentarily into engagement with the second branch of the pusher in order to cause the latter to pivot whilst switching its first toe from the bottom track to the top track.

According to a first arrangement, the control device is arranged to apply, to the said drive means, a continuous periodic speed profile which is variable according to the angular position of the cam, this speed being:

- of constant sign, so that the cam rotates in a single direction in the same direction as the movable support means;
- substantially constant and equal to a first value between the first and second angular positions of the cam;
- the cam rotates at a non-constant speed, increasing and then decreasing between the second and first angular positions of the cam.

According to a second arrangement, the control device is arranged to apply to the said drive means a continuous periodic speed profile which is variable according to the angular position of the cam, this speed being:

- of constant sign, so that the cam rotates in a single direction in the same direction as the movable support means;
- substantially constant and equal to a first value between the first and second angular positions of the cam;
- the cam rotates at a non-constant speed, increasing and then decreasing between the second and the first angular positions of the cam.

For example, this speed profile is chosen from amongst a preprogrammed set of speed profiles such that the actuation means selectively engage a certain number of successive pushers belonging to a predetermined subset of the set of pushers.

According to one embodiment, the means of driving the support means and/or the means of driving the actuating member comprise at least one motor whose rotation speed is continuously adjustable, such as an electric motor, of the brushless DC type.

Other objects and advantages of the invention will emerge during the following description of embodiments, a description given with reference to the accompanying drawings, in which:

DETAILED DESCRIPTION OF THE DRAWINGS

DETAILED DESCRIPTION OF THE INVENTION

In order to be packaged, articles undergo a certain number of operations which, for more convenience, are assumed to take place in the same substantially horizontal working plane M, along a conveying path, not shown, substantially in a longitudinal direction L, depicted in FIGS. 1 to 10.

FIGS. 1 to 10 also show a transverse direction T, substantially perpendicular to the longitudinal direction L whilst being contained in the working plane M.

An elevation direction E is also shown. This direction is substantially vertical, perpendicular to the plane M, so that the longitudinal L, transverse T and elevation E directions form an orthogonal reference frame with respect to which the present description is given.

The terms "upstream" and "downstream" are defined with respect to the longitudinal direction; the term "lateral" is defined with respect to the transverse direction, whilst the terms "top" and "bottom" are defined with respect to the elevation direction.

Figure 1:
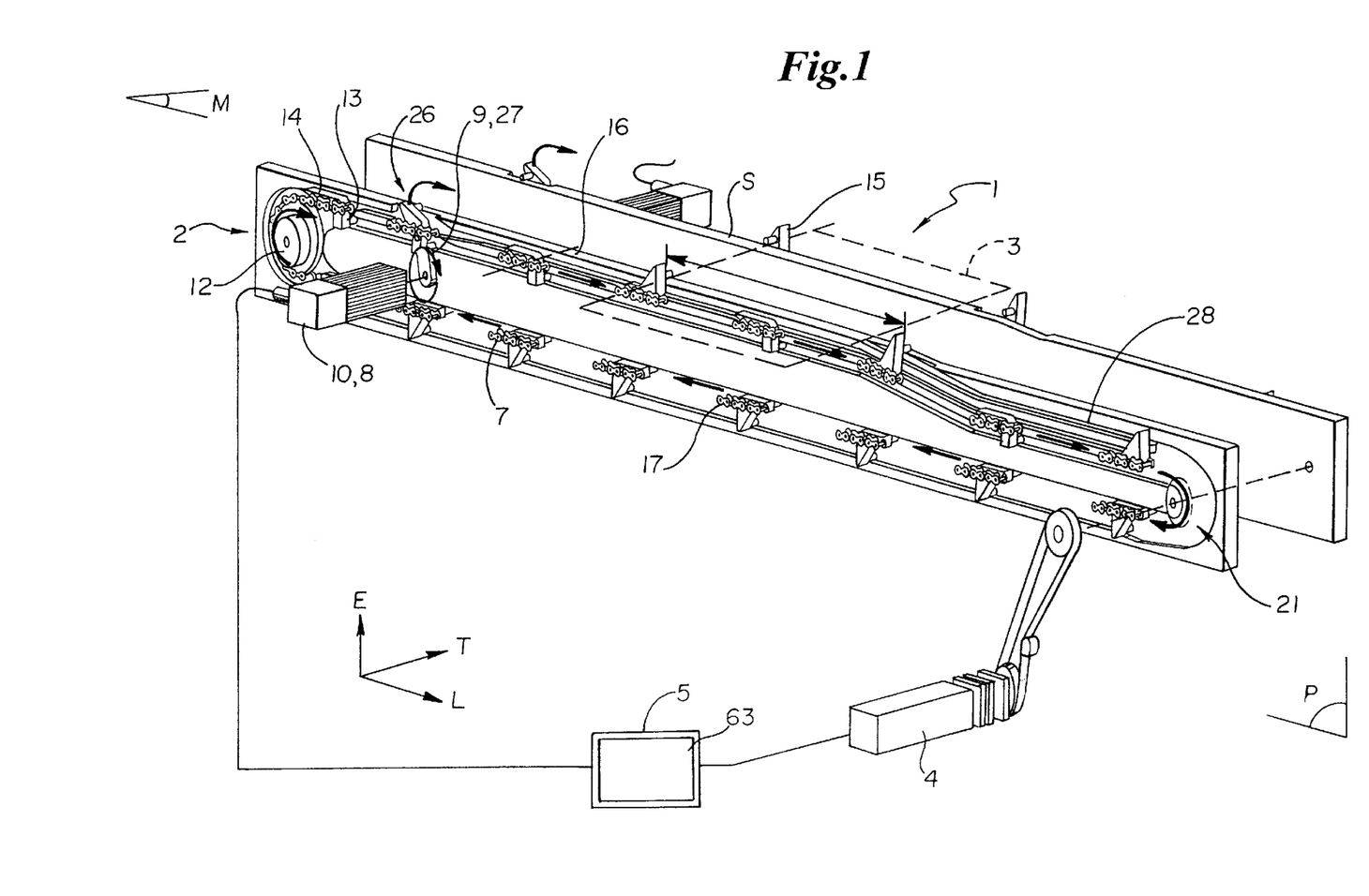
FIG. 1 is a perspective view of a conveying system comprising two parallel endless transporters for the routing of flat objects such as cardboard blanks or equivalent; these transporters each comprise a plurality of articulated pushers able to be engaged by an adjustable rotary actuating member.

FIG. 1 shows a conveying system 1 which includes:

- a transporter 2 extending substantially longitudinally, which routes, one by one, cardboard blanks 3 or equivalent from upstream to downstream;
- a means 4 of driving the said transporter 2, slaved to a control device 5.

The blanks 3 comprise for example a central panel on which the articles to be packaged are intended to be disposed, and around which lateral panels and flaps for holding the articles are hinged.

The blanks 3 are disposed flat on the transporter 2, whilst being extended transversely in the plane M (FIG. 1).

According to the embodiment illustrated in FIGS. 1 to 11, the transporter 2 comprises pushers 6, each being able to come into engagement with a blank 3 in order to route it from upstream to downstream.

The control device 5 has for example a computer memory 11 in which there are stored sets of speed profiles intended to be applied selectively to the drive means 4 and to each of any other drive means.

According to the functioning provided for each of these drive means, speed profiles which are constant or variable as a function of time are introduced into the control device 5, by programming in the memory 11.

The control device 5 is thus arranged to apply, to the drive means 4 notably, a speed profile chosen from amongst a preprogrammed set of speed profiles, introduced into the memory 11.

The drive means 4 is chosen so that constant speed profiles can be applied to it, the speed profile being modified when there is for example a change of rate.

To this end, it comprises for example a motor 8 whose rotation speed is variable and adjustable continuously. This motor is for example a brushes, DC, electric motor, referred to as a brushless motor.

The conveying system 1 is now described, according to a particular embodiment.

This conveying system 1 routes the blanks 3 flat, along a transportation surface S extending in a plane M, to a conveyor disposing them opposite the batches of articles to be packaged.

It is adjustable, so as to be able to transport blanks 3 of different sizes, according to the number of articles per batch and the pitch P.

To this end, the transporter 2 comprises a plurality of pushers 6 regularly spaced apart, fixed to a movable support 7 which defines a closed-loop path, locally contiguous with the transportation surface S.

The pushers circulate continuously, in a single direction and periodically along this path, which extends substantially in a plane P of longitudinal elevation, referred to as the conveying plane.

The support 7 is moved by the drive means 4, which is slaved to the control means 5 and whose speed can vary continuously.

To this end, the drive means 5 can comprise a motor 8 with an adjustable and/or variable rotation speed, for example a brushless motor.

Each pusher 6 is mounted so as to be able to move between a so-called inactive position in which the pusher 6 is located at a distance from the transportation surface S and does not project therefrom, and a so-called active position in which it projects at least partially from the transportation surface S.

In its active position, the pusher 6 comes into engagement with a blank 3 and pushes it along the transportation surface S.

Each pusher 6 can be actuated by a rotary movable member called a selector 9, coming into engagement with the pusher 6 in order to cause it to pass from its inactive position to its active position.

This selector 9 is set in movement by a drive means 10 whose speed is variable, and which for this purpose comprises a brushless motor, or any other type of motor whose rotation speed is adjustable and/or variable continuously.

The drive means 10 is slaved to the control device 5, whose memory 11 contains a preprogrammed set of non-constant speed profiles, applicable to the drive means 10.

According to an embodiment illustrated in the figures, the support 7 is an endless chain meshing with two pinions 12, at least one of which is associated with the motor 8.

In variants which are not shown, the support 7 is a notched belt, or a tractor cable, or any other equivalent means.

Figure 3:
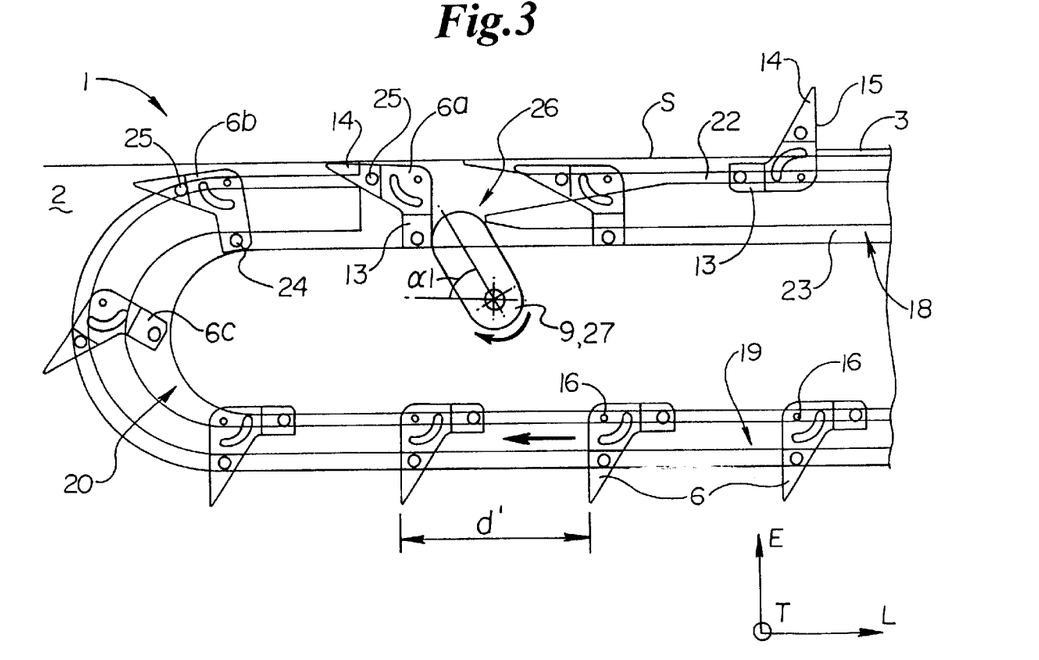
FIGS. 3 to 6 are longitudinal elevation views of the conveying system of FIGS. 1 and 2, which illustrate four successive steps of the pivoting of a pusher from a so-called inactive position to an active position, according to a first adjustment of the actuating member, so that the latter actuates one pusher out of two.

Whilst each pusher 6 is a rigid piece in the shape of a V which comprises a first branch 13 able to come into engagement with the selector, and a second branch 14 substantially perpendicular to the first (FIG. 3).

When the pusher is in the inactive position, this second branch 14 projects at least partially from the transportation surface S in order to come into engagement with a blank 3.

To this end, the second branch 14 comprises a surface 15 which, when the pusher 6 is in its active position, extends in a transverse elevation plane.

The pushers 6 are regularly distributed along the chain 7, on which each is mounted so as to pivot about a transverse shaft 16, forming a means of fixing the pusher 6 to the chain 7.

The pushers circulate along their path whilst being guided in a rail 17 which lies substantially in a longitudinal elevation plane, under the transportation surface S, parallel to this path.

The rail has a substantially rectilinear longitudinal top zone 18 contiguous with the transportation surface S, a bottom zone 19, also substantially rectilinear and longitudinal, located at a distance from the transportation surface S, connected by first and second end zones 20, 21, in the form of semicircles.

Along the top zone 18, the rail 17 separates into two tracks: a top track 22, contiguous with the transportation surface S, and a bottom track 23 located below the first track 22.

The pusher 6, for its part, comprises a first toe 24, projecting laterally from the first branch 13, and a second toe 25, projecting laterally from the second branch 14.

The toes 24, 25 allow both the guiding and the locking of the pusher 6 in the rail 17.

Figure 2:
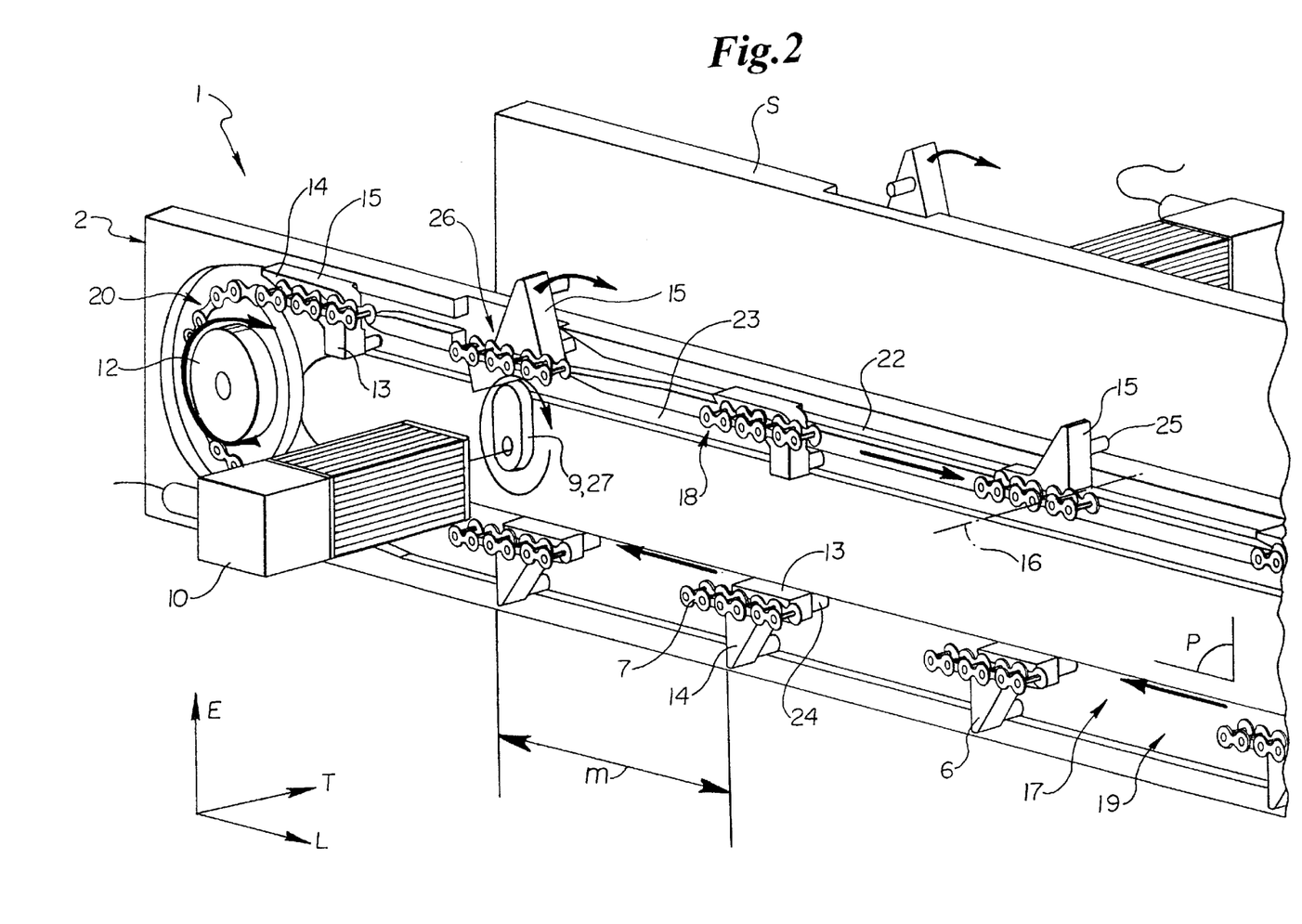
FIG. 2 is a detail view of FIG. 1, which illustrates the pivoting of a pusher in engagement with the actuating member.

Close to the first end zone 20, the transporter 2 has a switching zone 26 where the tracks 24, 25 are interrupted, to enable the pushers 6 to pivot freely about their shaft whilst passing from their inactive position to their active position (FIG. 2).

The selector 9 is disposed close to this switching zone 26.

In order to ensure the pivoting of the pushers, the selector 9 comprises a cam 27 extending substantially in the plane P, and driven in rotation in this plane P around a transverse shaft.

The angular position of the cam 27 in the plane P is denoted α.

The cam 27 is adjacent to the top zone 18 of the rail, in order to come momentarily into engagement with the second branch 14 of the pusher 6 so as to cause the latter to pivot.

During its rotation, the cam 27 passes through a first angular position α1 in which it engages at least the pusher 6 in order to cause it to pivot about its axis 16, and a second angular position α2 in which it releases the pusher 6.

The conveying system 1 is designed so that the cam 27 acts on a predetermined subset of the set of pushers 6 of the transporter 2.

To this end, the functioning of the cam 27 is periodic, its period being defined as the interval of time separating two successive passages of the cam 27 through the same angular position.

If the period of the transporter 2 is defined as the interval of time separating the passage of two pushers through the same point on the path defined by the chain 7, the period of the cam 7 is a multiple of the period of the transporter 2.

The period of the cam 27 can be adjusted by applying to its drive means 10 a speed profile chosen from amongst a set preprogrammed in the memory 11 of the control device 5.

Thus the cam 27 is designed to actuate one pusher 6 out of two, one out of three, one out of four, or more. Its rotation speed VC is therefore regulated accordingly.

It is therefore possible to vary the number of pushers simultaneously in the active position.

The speed VC at which the cam 27 is driven by its drive means 10 is continuous, periodic, and according to the angular position a of the cam 27.

Figure 11:
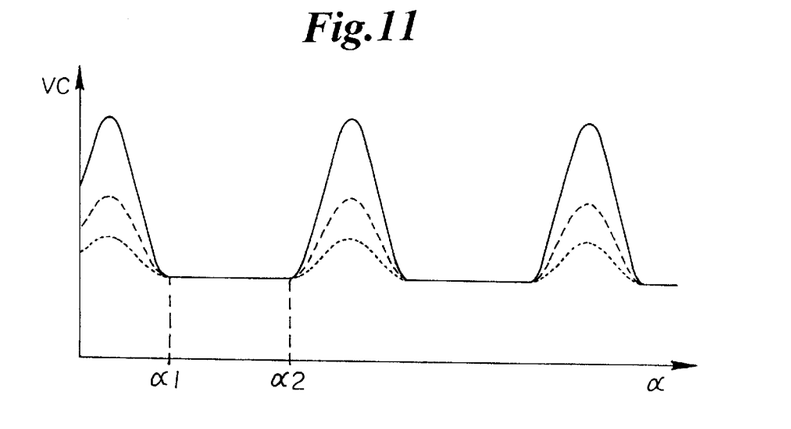
FIG. 11 is a diagram illustrating the change in the rotation speed of the actuating member of the conveying system of FIGS. 1 to 10, as a function of its angular position, according to a first adjustment in which the actuating member comes into engagement with one pusher out of two (solid lines), according to a second adjustment in which it comes into engagement with one pusher out of three (dot and dash lines), and according to a third adjustment in which it comes into engagement with one pusher out of four (broken lines).

Notably, the speed VC has notably the following characteristics (FIG. 11):

it is of constant sign, so that the cam 27 turns in a single direction in the same direction as the chain 7;

it is substantially constant from the first angular position a1 up to the second angular position α2 of the cam 27;

it is non-constant, for example increasing and then decreasing, or vice-versa according to the setting, from the second angular position α2 up to the first angular position α1 of the cam 27.

The speed profile of the cam 27 is for example chosen from amongst a set of speed profiles preprogrammed in the memory 11 of the control device 5.

In this way, according to its speed, the cam 27 can selectively engage a certain number of successive pushers 6 belonging to a predetermined subset of the set of pushers 6.

Three speed profiles VC of the cam 27, according to its angular position, are shown in FIG. 11.

The profile depicted in solid lines corresponds to a setting of the cam 27 according to which the latter actuates one pusher 6 out of two.

Whilst the profiles shown in dot-and-dash and broken lines correspond respectively to two settings according to which the cam 27 actuates one pusher out of three and one pusher out of four.

The distance d separating the surfaces 15 of two successive pushers in the active position is substantially equal to the pitch P of the installation.

This is because this distance corresponds to the distance between two successive blanks 3, intended to be disposed opposite batches of articles, for example below these, prior to the making up of the packs.

The distance d is therefore a multiple of the distance m separating two successive pushers 6 on the chain 7.

This distance m, referred to as the modulus, is fixed at the time of manufacture of the installation, and notably of the conveying system 1.

An operating mode of the conveying device 1 is now described, according to a first setting in which the cam 27 engages one pusher 6 out of two, with reference to the figures.

For this purpose the travel of successive first, second and third pushers 6a, 6b, 6c along their path is followed, starting from a location where the pushers 6a, 6b, 6c are all three in the bottom zone 19 of the rail 17.

The three pushers 6a, 6b, 6c are routed along the bottom zone 19, then along the first end zone 20, whilst being kept fixed with respect to rotation in the rail 17, the toes 24, 25 being in abutment against the edges of the rail.

On leaving the first end zone 20, the first toe 24 of the pushers 6a, 6b, 6c is guided by the bottom track, whilst the second toe 25 is guided by the top track 22.

The pushers 6a, 6b, 6c are then all three in their inactive position.

When the first pusher 6a emerges in the switching zone 26, its second branch 14 abuts against the cam 27, the latter being in its first angular position α1. The cam 27 then forces the pusher 6a to pivot about its shaft (FIG. 3).

Figure 4:
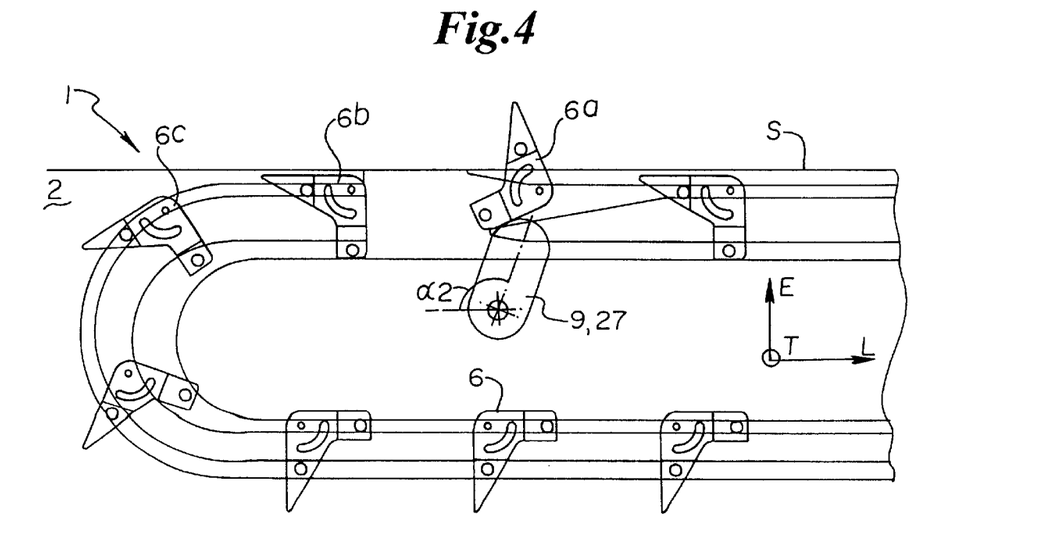

Under the action of the cam 27, which accompanies the first pusher 6a at constant speed, the first toe 25 is switched towards the top track 22, the second branch 14 projecting from the transportation surface S upwards, in order to come into engagement with a blank 3 (FIG. 4). The first pusher is then in its active position.

When the cam 27, in the second angular position α2, disengages the first pusher 6a, the latter is kept fixed with respect to rotation, its second toe 25 being guided by the top track 22 of the rail along the transportation surface S.

Figure 5:
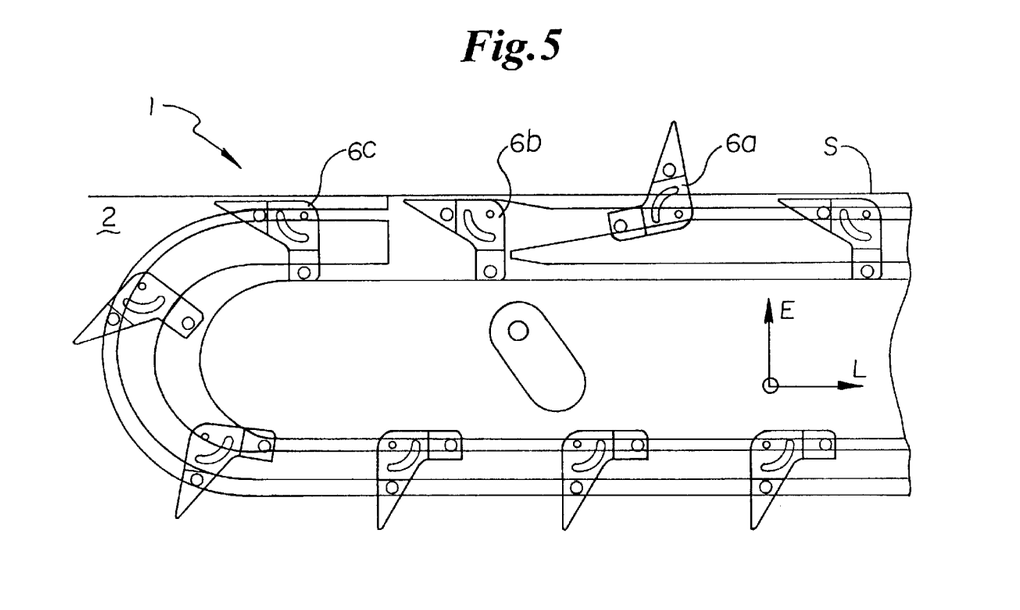

The cam 27 then accelerates, pivoting about its shaft. During this time, the second pusher 6b travels through the switching zone 26 whilst remaining in its inactive position (FIG. 5).

Figure 6:
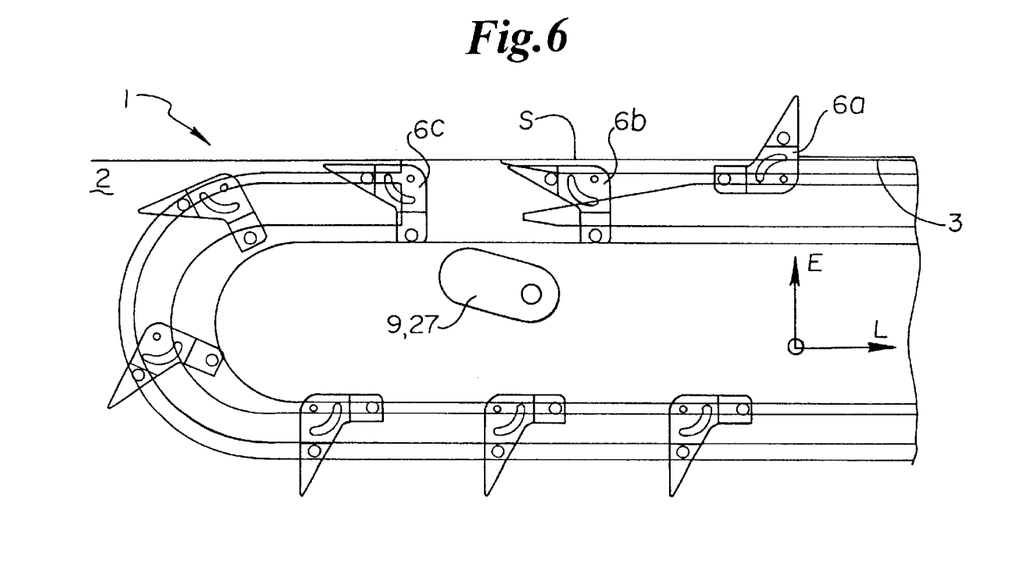
Figure 7:
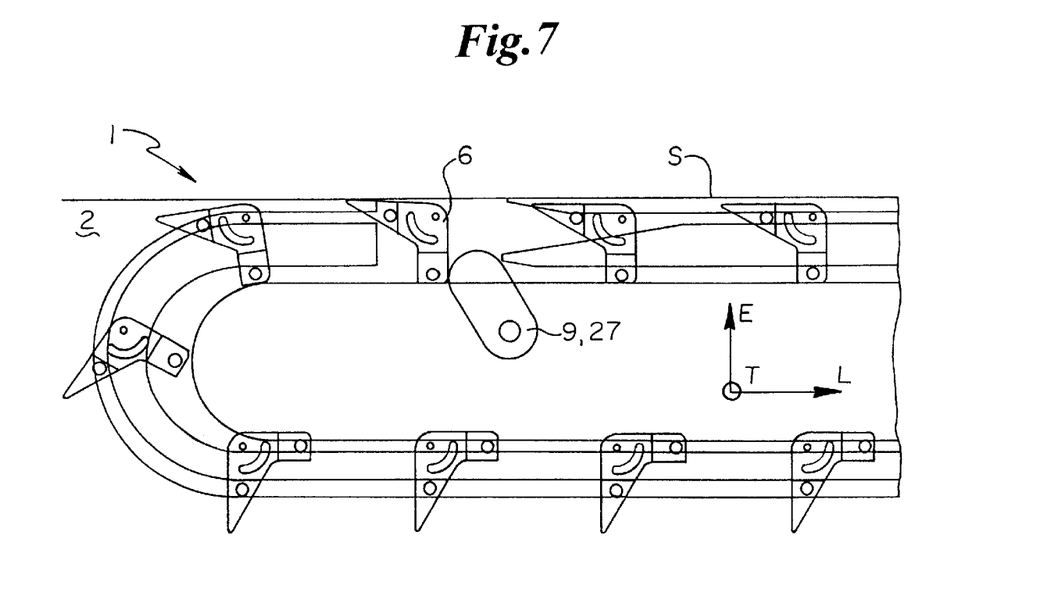
FIGS. 7 to 10 are views similar to the views of FIGS. 3 to 6, which illustrate four successive steps of the pivoting of a pusher from a so-called inactive position to an active position, according to a second adjustment of the actuating member, so that the latter actuates one pusher out of three.
Figure 8:
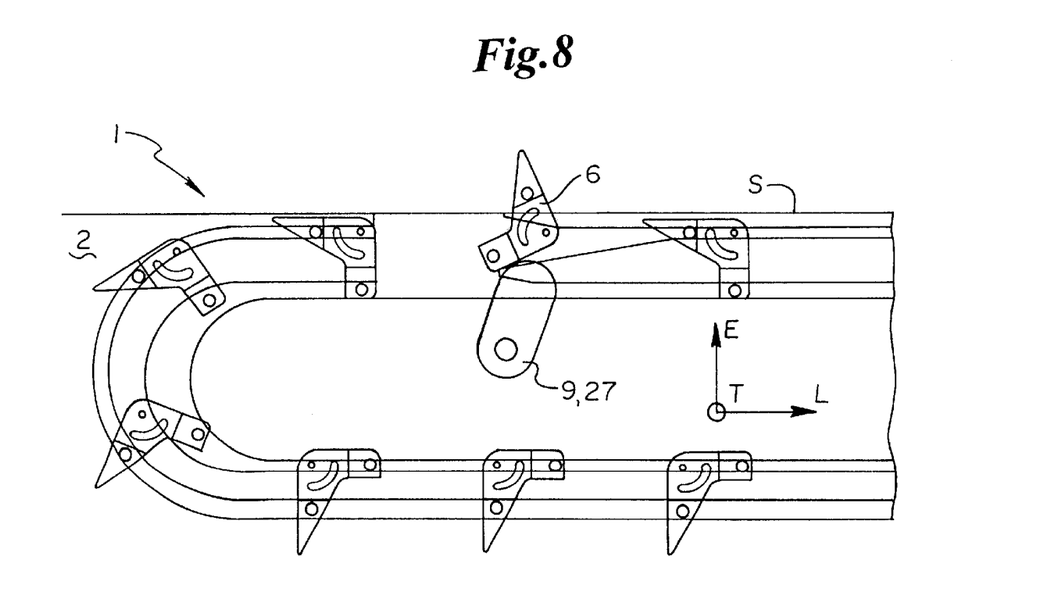
Figure 9:
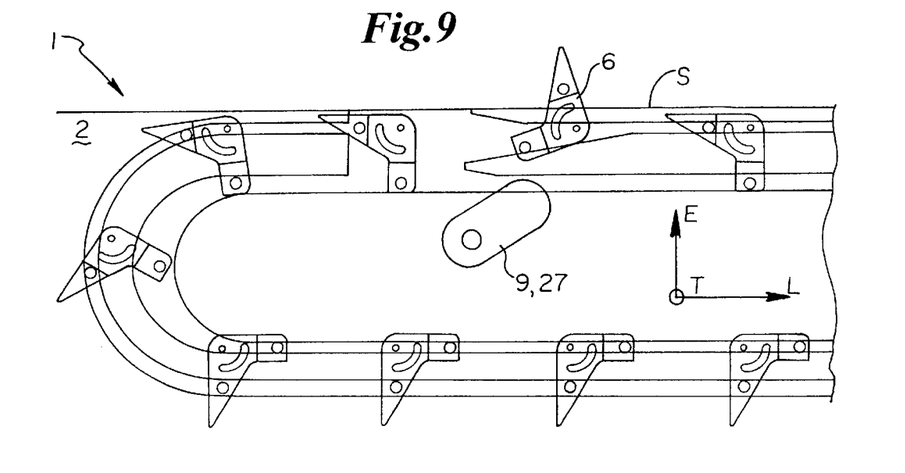
Figure 10:
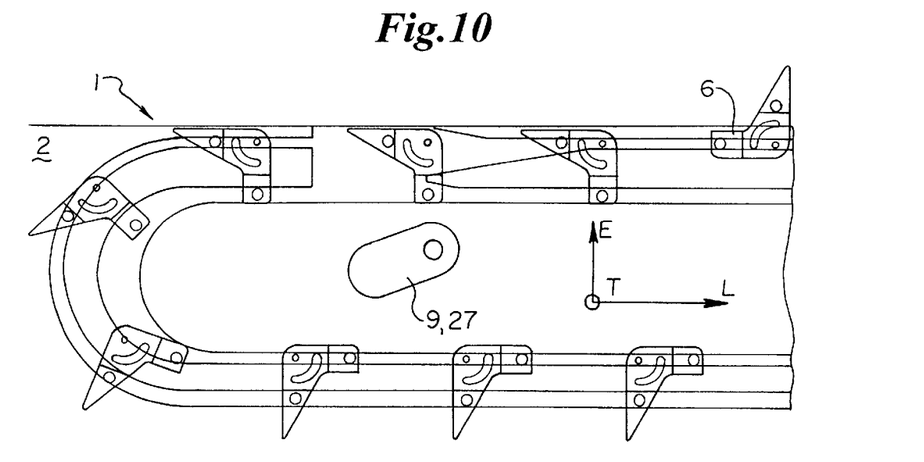

Then the cam 27 decelerates in order to regain its first angular position α2, and engage the second pusher 6c in the same way as the first pusher 6a (FIG. 6).

Each pusher 6 pushes a blank 3 up to the exit conveyor (not shown). After the blank has been taken over by the said conveyor, the pusher 6 returns to its inactive position in the second end zone 21 of the transporter 2, for example by pivoting by gravity about its shaft.

To this end, the rail 17 comprises an auxiliary track 28 emerging in the transportation surface S, connecting the latter to the second end zone 21.

Close to this end zone 21, the auxiliary track 28, the top track 22 and the bottom track 23 are locally inclined downwards in order to force the active pushers 6 to move away from the transportation surface S and release the blanks 3.

According to a second setting in which the maximum rotation speed of the cam 27 is reduced, the latter can engage one pusher 6 out of three. This operating mode, identical to that which has just been described, is illustrated in FIGS. 7 to 10.

In this operating mode, the conveying system 1 is adjusted so that the selector 9 activates one pusher 6 out of two.

The blanks 3 routed by the transporter 2 are chosen within dimensions which depend on the pack to be produced, the longitudinal dimension of the blank 3 obviously being less than the pitch P.

By choosing as a value of the modulus m the length of a pack of n articles of one batch, the pitch can be chosen as follows: $P = m \times n$ (1).

The size of the blank 3 is changed.

A change in the speed profile for the selector 9 is demanded, by means of the device 5, so that its average speed is reduced by one third.

It then rotates less quickly, in order to activate one pusher 6 out of three instead of one pusher 6 out of two. The distance between two active pushers 6, equal to the pitch, is then equal to three times the module, according to equation (1) above.

In addition, the speed of operation of the packaging means is also reduced by one third, packs of six being further spaced apart than packs of two.

The conveying system thus makes it possible to move packaging blanks or other types of article of variable size by actuating all or only some of the pushers 6.

Naturally the throughput of the system can be adjusted by simultaneously and progressively increasing the speeds of rotation of all the drive means.

This is made possible by the use of motors with a rotation speed which is adjustable or variable continuously, combined with the use of a control and slaving device able to synchronise the drive means and to apply to them speed profiles already programmed in memory.

What is claimed is:

1. A system for conveying objects (1), which comprises at least one endless transporter (2) able to route objects (3) along a transportation surface (S) and means (4) of driving same, said transporter (2) comprising a plurality of rushers (6) regularly spaced apart, fixed to a movable support (7) for the pushers (6), continuously traveling, in a single direction and periodically along a closed-loop oath which substantially extends in a conveying plane (P), perpendicular to said transportation surface (S), said path being locally contiguous with said transportation surface (S), characterised in that each rusher (6) is mounted so as to be able to move between an inactive position in which the pusher (6) is located at a distance from said transportation surface (S) and does not project therefrom, and an active position in which the pusher projects at least partially from said transportation surface (S) in order to come into engagement with the object (3) and push the object along said surface (S), so that it is possible to vary the number of pushers (6) simultaneously in the active position, said system further comprising a movable member (9) for actuating the pushers (6) in order to cause them to pass from the inactive position to the active position at the transportation surface, means (10) of driving the said actuating member, and a device (5) for controlling the drive means (4, 10), said control device (5) being arranged to apply, to the means (10) for driving the actuating member (9), a non-constant speed profile, chosen from amongst a preprogrammed set of speed profiles.

2. A system according to claim 1, characterised in that the control device (5) is arranged to apply, to the means (4) for driving the support (7), a speed profile chosen from amongst a preprogrammed set of speed profiles.

3. A system for conveying objects (1), which comprises at least one endless transporter (2) able to route objects (3) along a transportation surface (S) and means (4) of driving same, said transporter (2) comprising a plurality of pushers (6) regularly spaced apart, fixed to a movable support (7) for the pushers (6), continuously traveling, in a single direction and periodically along a closed-loop path which substantially extends in a conveying plane (P), perpendicular to said transportation surface (S), said oath being locally contiguous with said transportation surface (S), characterised in that each pusher (6) is mounted so as to be able to move between an inactive position in which the pusher (6) is located at a distance from said transportation surface (S) and does not project therefrom, and an active position in which the pusher projects at least partially from said transportation surface (S) in order to come into engagement with the object (3) and push the object along said surface (S), so that it is possible to vary the number of pushers (6) simultaneously in the active position, said system further comprising a movable member (9) for actuating the pushers (6) in order to cause them to pass from the inactive position to the active position at the transportation surface, means (10) of driving said actuating member, and a device (5) for controlling the drive means (4, 10), said control device (5) being arranged to apply, to the means (10) of driving the actuating member (9), a speed profile such that the functioning of the actuating member (9) is periodic, the period of the actuating member (9) being defined as the interval of time separating two successive passages of the actuating member (9) through the same position.

4. A system according to claim 3, characterised in that, the period of the transporter (2) being defined as the interval of time separating the passage of two pushers (6) through the same point on the path, the control device (5) is arranged so that the period of the actuating member (9) is a multiple of the period of the transporter (2).

5. A system according to claim 1, characterised in that said movable support (7) is an endless chain meshing with two pinions, at least one of which is slaved to the control device (5).

6. A system for conveying objects (1) comprising at least one endless transporter (2) able to route objects (3) along a transportation surface (S) the transporter (2) comprising a plurality of pushers (6) regularly spaced apart, fixed to a movable support (7) for the pushers (6), continuously traveling, in a single direction and periodically along a closed-loop oath which substantially extends in a conveying plane (P), perpendicular to said transportation surface (S), the path being locally contiguous with the transportation surface (S), characterised in that each pusher (6) is mounted so as to be able to move between an inactive position in which the pusher (6) is located at a distance from the transportation surface (S) and does not project therefrom, and an active position in which the rusher projects at least partially from the transportation surface (S) in order to come into engagement with the object (3) and rush the object along said surface (S), so that it is possible to vary the number of rushers (6) simultaneously in the active position, each pusher being in the form of a rigid piece which comprises a first branch (13) able to engage the drive member (9), and a second branch (14) substantially perpendicular to the first, able to project at least partly from the transportation surface (S) in order to engage the object (3), each pusher comprising a spindle (16) substantially perpendicular to the conveying plane (P), forming a means of fixing the rusher (6) to the support (7), and about which the rusher (6) is able to pivot, in order to pass from the inactive position to the active position, or vice-versa, said transporter further comprising a guide rail (17) which extends substantially in the conveying plane (P), substantially along the oath defined by the support (7), said guide rail (17) comprising, substantially along the transportation surface (S), a first top track (28) for guiding the pushers (6), contiguous with the transportation surface (S), and a second bottom track (23) for guiding the pushers (6), parallel to the first.

7. A system according to claim 6, characterised in that said second branch (14) has a surface (15) substantially perpendicular to said conveying plane (P), and which, when the pusher (6) is in its active position, extends substantially perpendicularly to the transportation surface (S) in order to come into contact with the object (3).

8. A system according to claim 6, characterised in that each pusher (6) comprises at least one first toe (24), projecting from the first branch (13) substantially perpendicularly to the conveying plane (P), able to cooperate with the bottom track (23) when the pusher (6) is in the inactive position, and with the top track (22) when the pusher (6) is in the active position.

9. A system according to claim 8, characterised in that each pusher (6) also comprises at least a second toe (25), projecting from the second branch (14) perpendicularly to the conveying plane (P), able to cooperate with the top track (22) when the pusher (6) is in the inactive position.

10. A system according to claim 6, characterised in that the transporter (2) includes a switching zone (26) where the guide rail (17) is interrupted, and in which the pushers (6) are able to pivot about the spindle (16) thereof in order to pass from said inactive position to said active position.

11. A system according to claim 10, characterised in that the actuating member (9) comprises a cam (27) extending substantially in the conveying plane (P) close to said switching zone (26), and driven in rotation therein about a shaft substantially perpendicular to said conveying plane by a drive means (10), passing from a first angular position ($\alpha$1) in which said cam (27) engages at least one of the pushers (6) in order to cause said at least one of said pushers to pivot about said shaft from said inactive position to said active position when passing through the switching zone (26), to a second angular position ($\alpha$2) in which said cam (27) releases the pusher (6).

12. A system according to claim 11, characterised in that each pusher comprises at least one first toe projecting from the first branch, and said cam (27) is arranged in order to come momentarily into engagement with the second branch (14) of the pusher (6) in order to cause the second branch to pivot by switching said first toe (24) from the bottom track (23) to the top track (22).

13. A system according to claim 11, characterised in that the system comprises a control device, (5) arranged to apply to the drive means (10) a continuous periodic speed profile, variable according to the angular position (a) of said cam (27), said speed being:

of constant sign, so that said cam (27) rotates in a single direction in the same direction as the movable support (7);

substantially constant between the first and second angular positions (a1, a2) of said cam (27);

non-constant, increasing and then decreasing between the second and first angular positions (a2, a1) of said cam (27).

14. A system according to claim 11, characterised in that the system comprises a control device, (5) arranged to apply, to the drive means (10), a continuous periodic speed profile, variable according to the angular position of the cam (27), said speed being:

of constant sign, so that said cam (27) rotates in a single direction in the same direction as the movable support (7);

substantially constant between the first and second angular positions (a1, a2) of said cam (27);

the cam (27) rotates at a non-constant speed, decreasing and then increasing between the second and first angular positions (a2, a1) of said cam (27).

15. A system according to claim 13, characterised in that the speed profile is chosen from amongst a preprogrammed set of speed profiles such that the actuating member (9) engages selectively a certain number of successive pushers (6) belonging to a predetermined subset of the set of pushers (6).

16. A system according to claim 1 characterised in that the means (4) of driving the support (7) comprises at least one motor (8) whose rotation speed is continuously adjustable.

17. A system according to claim 1 characterised in that the means (10) of driving the actuating member (9) comprises at least one motor (8) whose rotation speed is continuously adjustable.

18. A system according to claim 16 characterised in that said motor (8) is an electric motor, of the brushless DC type.

19. A system according to claim 3 characterised in that said movable support (7) is an endless chain meshing with two pinions, at least one of which is slaved to the control device (5).

20. A system according to claim 3 characterised in that the control device (5) is arranged to apply, to the means (4) for driving the support (7), a speed profile chosen from amongst a preprogrammed set of speed profiles.

21. A system according to claim 3, characterised in that the means (4) of driving the support (7) comprises at least one motor (8) whose rotation speed is continuously adjustable.

22. A system according to claim 3, characterised in that the means (10) of driving the actuating member (9) comprises at least one motor (8) whose rotation speed is continuously adjustable.

23. A system according to claim 21, characterised in that said motor (8) is an electric motor, of the brushless DC type.

* * * * *

UNITED STATES PATENT AND TRADEMARK OFFICE
CERTIFICATE OF CORRECTION

PATENT NO. : 6,662,933 B2  Page 1 of 1
DATED : December 16, 2003
INVENTOR(S) : De Guglielmo et al.

It is certified that error appears in the above-identified patent and that said Letters Patent is hereby corrected as shown below:

Column 9,
Line 17, delete "rusher" and insert therefor -- pusher --.
Line 40, delete "(5)" and insert therefor -- (S) --.
Line 46, delete "oath" and insert therefor -- path --.

Column 10,
Line 25, delete "rush" and insert therefor -- push --.
Line 27, delete "rushers" and insert therefor -- pushers --.
Line 35, delete "rusher", first and second occurrence, and insert therefor -- pusher --.
Line 39, delete "oath" and insert therefor -- path --.

Signed and Sealed this

Twentieth Day of September, 2005

JON W. DUDAS
*Director of the United States Patent and Trademark Office*